US011803899B2

(12) United States Patent
Benkreira et al.

(10) Patent No.: US 11,803,899 B2
(45) Date of Patent: *Oct. 31, 2023

(54) USING PROOF OF PURCHASE FOR MULTIFACTOR AUTHENTICATION

(71) Applicant: Capital One Services, LLC, McLean, VA (US)

(72) Inventors: Abdelkader M'Hamed Benkreira, Brooklyn, NY (US); Michael Mossoba, Great Falls, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/880,064

(22) Filed: Aug. 3, 2022

(65) Prior Publication Data
US 2022/0377072 A1 Nov. 24, 2022

Related U.S. Application Data

(63) Continuation of application No. 16/914,796, filed on Jun. 29, 2020, now Pat. No. 11,457,011.

(51) Int. Cl.
*H04W 12/06* (2021.01)
*G06Q 40/02* (2023.01)
(Continued)

(52) U.S. Cl.
CPC ........... *G06Q 40/02* (2013.01); *G06K 7/1413* (2013.01); *G06N 7/02* (2013.01); *G06Q 30/0185* (2013.01);
(Continued)

(58) Field of Classification Search
CPC .... G06Q 40/02; G06Q 40/12; G06Q 30/0185; G06Q 50/265; G06Q 20/209; H04L 67/52; H04L 63/0876; H04L 63/102; H04L 63/107; H04L 67/306; H04L 2463/082; G06K 7/1413; G06N 7/02; G06V 40/00; G06V 10/82
See application file for complete search history.

(56) References Cited

U.S. PATENT DOCUMENTS

10,783,576 B1 9/2020 Van Os et al.
11,042,852 B1* 6/2021 Wadhwa .......... G06Q 20/40145
(Continued)

*Primary Examiner* — Dai Phuong
(74) *Attorney, Agent, or Firm* — Banner & Witcoff, Ltd.

(57) ABSTRACT

Multifactor authentication techniques described herein may allow a user to submit a recent proof of purchase as a part of a multifactor authentication process to access an account associated with a financial institution. As part of the login process, the user may submit a proof of purchase associated with a transaction. The financial institution may determine information associated with the transaction, such as a merchant associated with the proof of purchase, a time of the transaction, the last four numbers of the transaction card used, a dollar amount, or any combination thereof. If the information matches one or more records in the transaction history of the user's account, the financial institution may authenticate the user and provide access to the account. In this way, the financial institution may leverage transaction history known to the financial institution and the user to authenticate the user.

20 Claims, 10 Drawing Sheets

(51) Int. Cl.
*H04L 9/40* (2022.01)
*G06Q 30/018* (2023.01)
*G06Q 40/12* (2023.01)
*G06Q 50/26* (2012.01)
*G06K 7/14* (2006.01)
*G06N 7/02* (2006.01)
*H04L 67/306* (2022.01)
*H04L 67/52* (2022.01)
*G06Q 20/20* (2012.01)
*G06V 10/82* (2022.01)
*G06V 40/00* (2022.01)

(52) U.S. Cl.
CPC ........... *G06Q 40/12* (2013.12); *G06Q 50/265* (2013.01); *H04L 63/0876* (2013.01); *H04L 63/102* (2013.01); *H04L 63/107* (2013.01); *H04L 67/306* (2013.01); *H04L 67/52* (2022.05); *G06Q 20/209* (2013.01); *G06V 10/82* (2022.01); *G06V 40/00* (2022.01); *H04L 2463/082* (2013.01)

(56) References Cited

U.S. PATENT DOCUMENTS

| | | |
|---|---|---|
| 2009/0194585 A1* | 8/2009 | Blackson ............... G06Q 20/04 235/379 |
| 2014/0189829 A1 | 7/2014 | McLachlan et al. |
| 2014/0258169 A1* | 9/2014 | Wong ................. G06Q 30/0282 705/347 |
| 2016/0078467 A1 | 3/2016 | Vosters et al. |
| 2018/0268414 A1* | 9/2018 | Chung ................ G06Q 20/409 |
| 2018/0276658 A1* | 9/2018 | Liscia ................. G06Q 20/102 |
| 2018/0375659 A1* | 12/2018 | Kozma ................ H04L 63/083 |
| 2019/0108507 A1 | 4/2019 | Cohen |
| 2020/0074441 A1 | 3/2020 | Lorenz |
| 2021/0073752 A1 | 3/2021 | Le Huerou et al. |
| 2021/0203648 A1* | 7/2021 | Eng ....................... G06Q 20/382 |
| 2021/0256524 A1* | 8/2021 | Willis ............... G06Q 20/4016 |
| 2021/0287227 A1 | 9/2021 | Ikonomov |
| 2021/0374234 A1* | 12/2021 | Bursell ............... G06F 21/6218 |
| 2022/0051231 A1 | 2/2022 | Laracey |

* cited by examiner

USING PROOF OF PURCHASE FOR MULTIFACTOR AUTHENTICATION

CROSS-REFERENCE TO RELATED APPLICATIONS

The present application is a continuation of U.S. application Ser. No. 16/914,796, filed Jun. 29, 2020 and entitled "Using Proof of Purchase for Multifactor Authentication," the entirety of which is herein incorporated by reference.

FIELD OF USE

Aspects of the disclosure relate generally to authentication and more specifically to a multifactor authentication using a proof of purchase as an authentication factor.

BACKGROUND

Issues of account takeover—where a malicious actor gains access to a user's data and/or one of the user's contact methods (e.g., an email address, a phone number, etc.)—typically occur in a short time frame. For instance, the malicious actor may attempt to login via an application or website. Alternatively, the malicious actor may phone a call center pretending to be the customer in an attempt to gain access to an account. In both examples, the malicious actor may attempt to gain access to the account, for example, to reset passwords, change account settings, etc. While multifactor authentication and security questions are useful tools in protecting against malicious actors, multifactor authentication and security questions are both susceptible, for example, due to user information being publicly available or users sharing information via social media sites.

SUMMARY

The following presents a simplified summary of various features described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

The multifactor authentication techniques described herein may allow a user to submit a recent proof of purchase (e.g., a receipt, a UPC code, a SKU number, a photo of the good, etc.) as a part of a multifactor authentication process. In this regard, a financial institution may leverage transaction history known to the financial institution and the user and not, otherwise, generally available to the public. The malicious actor would not have access to proofs of purchase associated with the account that were more than a predetermined age (e.g., older than a few hours). Using a recent proof of purchase may improve the security of login attempts at financial institutions and reduce the likelihood of account takeover attempts being performed successfully.

Methods, devices, systems, and/or computer-readable media described herein may comprise using a proof of purchase (e.g., a receipt, a UPC code, a SKU number, a photo of the good, etc.) as part of a multifactor authentication process. In this regard, a user may submit a proof of purchase to establish that the user is a valid accountholder. The user may submit an image of the proof of purchase, and a server may validate the proof of purchase and determine information associated with the transaction. This information may comprise a merchant associated with a receipt, a time of the transaction, the last four numbers of the transaction card used for the transaction, a dollar amount, or any combination thereof. The server may compare the information to a transaction history of the user. If a matching transaction is found, then the customer may be verified as a valid accountholder and would be granted permission accordingly. In some examples, itemized data from the proof of purchase may be associated with a transaction.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description, reference is made to the accompanying drawings, which form a part hereof, and in which are shown various examples of features of the disclosure and/or of how the disclosure may be practiced. It is to be understood that other features may be utilized and structural and functional modifications may be made without departing from the scope of the present disclosure. The disclosure may be practiced or carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, features discussed herein may relate to methods, devices, systems, and/or computer-readable media for leveraging transaction records for use as part of a multifactor authentication process. Multifactor authentication may use two or more pieces of knowledge-based factors, possession-based factors, inherent-based factors, and/or location-based factors. Knowledge-based factors may comprise information that the user knows, such as a username, password, personal identification number, etc.; possession-based factors may comprise something in the user's possession, such as a token, a transaction card, a key card, etc.; and inherent-based factors may comprise aspects that are unique to the user, such as biometric identifiers (e.g., facial recognition, fingerprint scans, voiceprints, iris recognition, etc.) and behavioral elements (e.g., keystroke speed); and location-based factors may comprise a user's location, such as a geographic location or a network address. Financial institutions are in a unique position to expand the possession factors to include transaction history, for example, by permitting a user to submit a proof of purchase (e.g., a receipt, a UPC code, a SKU number, a photo of the good, etc.) as a part of a multifactor authentication. The financial institution may validate the proof of purchase and compare the proof of purchase (e.g., the information contained therein) to transaction records to verify the user and provide access to the account and/or account information. This may improve security, for example, when a user accesses their account or when the user's device is lost or stolen. Additionally, the techniques described herein may reduce the likelihood of successful account takeover attempts by a malicious actor.

Figure 1:
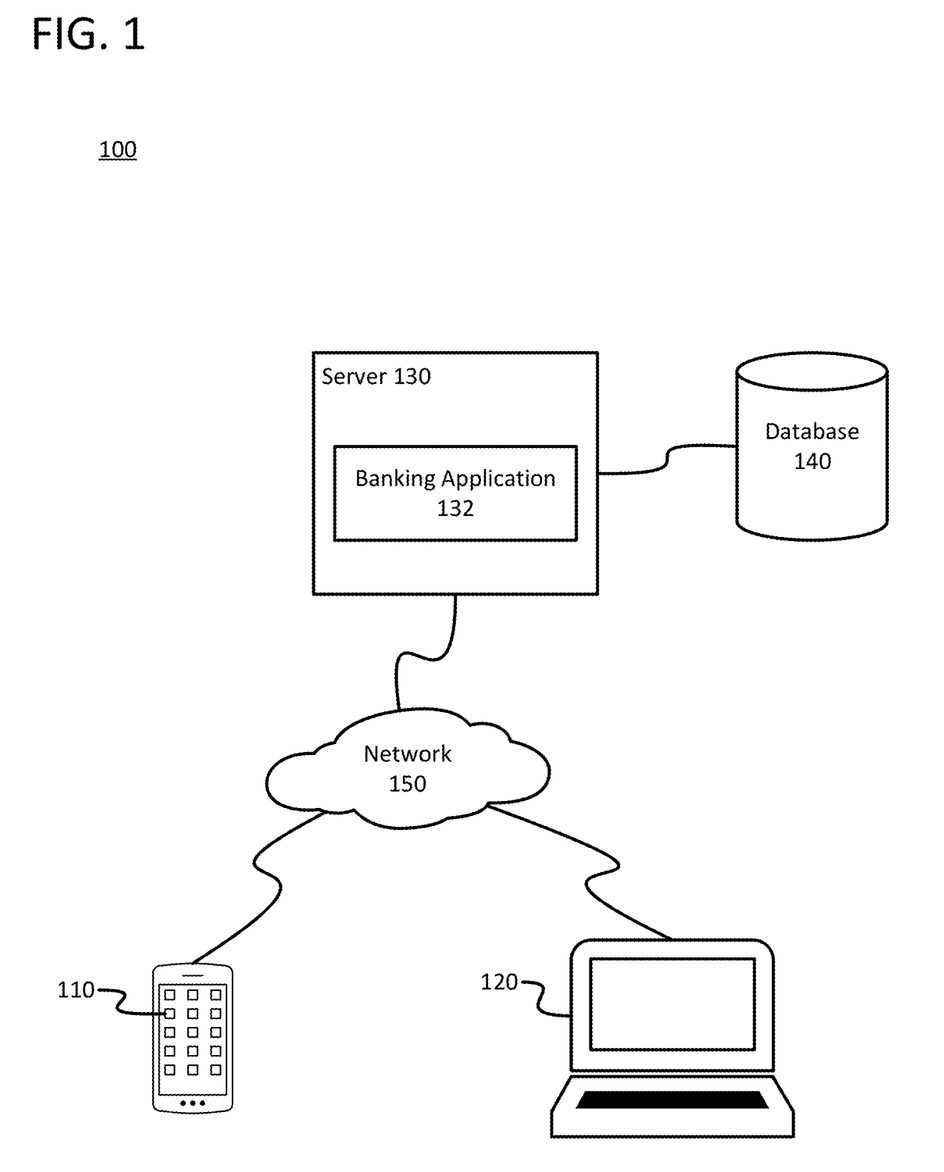
FIG. 1 shows an example of a system in which one or more features described herein may be implemented.

FIG. 1 shows an example of a system 100 that includes a first user device 110, a second user device 120, and a server 130, connected to a first database 140, interconnected via network 150.

First user device 110 may be a mobile device, such as a cellular phone, a mobile phone, a smart phone, a tablet, a laptop, or an equivalent thereof. First user device 110 may provide a first user with access to various applications and services. For example, first user device 110 may provide the first user with access to the Internet. Additionally, first user device 110 may provide the first user with one or more applications ("apps") located thereon. The one or more applications may provide the first user with a plurality of tools and access to a variety of services. In some embodiments, the one or more applications may include a banking application that provides access to the first user's banking information, as well as perform routine banking functions, such as checking the first user's balance, paying bills, transferring money between accounts, withdrawing money from an automated teller machine (ATM), and wire transfers. The banking application may comprise an authentication process to verify (e.g., authenticate) the identity of the first user prior to granting access to the banking information.

Second user device 120 may be a computing device configured to allow a user to execute software for a variety of purposes. Second user device 120 may belong to the first user that accesses first user device 110, or, alternatively, second user device 120 may belong to a second user, different from the first user. Second user device 120 may be a desktop computer, laptop computer, or, alternatively, a virtual computer. The software of second user device 120 may include one or more web browsers that provide access to websites on the Internet. These websites may include banking websites that allow the user to access his/her banking information and perform routine banking functions. In some embodiments, second user device 120 may include a banking application that allows the user to access his/her banking information and perform routine banking functions. The banking website and/or the banking application may comprise an authentication component to verify (e.g., authenticate) the identity of the second user prior to granting access to the banking information.

Server 130 may be any server capable of executing banking application 132. Additionally, server 130 may be communicatively coupled to first database 140. In this regard, server 130 may be a stand-alone server, a corporate server, or a server located in a server farm or cloud-computer environment. According to some examples, server 130 may be a virtual server hosted on hardware capable of supporting a plurality of virtual servers.

Banking application 132 may be server-based software configured to provide users with access to their account information and perform routing banking functions. In some embodiments, banking application 132 may be the server-based software that corresponds to the client-based software executing on first user device 110 and second user device 120. Additionally, or alternatively, banking application 132 may provide users access to their account information through a website accessed by first user device 110 or second user device 120 via network 150. The banking application 132 may comprise an authentication module to verify users before granting access to their banking information.

First database 140 may be configured to store information on behalf of application 132. The information may include, but is not limited to, personal information, account information, and user-preferences. Personal information may include a user's name, address, phone number (i.e., mobile number, home number, business number, etc.), social security number, username, password, employment information, family information, and any other information that may be used to identify the first user. Account information may include account balances, bill pay information, direct deposit information, wire transfer information, statements, and the like. User-preferences may define how users receive notifications and alerts, spending notifications, and the like. First database 140 may include, but are not limited to relational databases, hierarchical databases, distributed databases, in-memory databases, flat file databases, XML databases, NoSQL databases, graph databases, and/or a combination thereof.

First network 150 may include any type of network. In this regard, first network 150 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
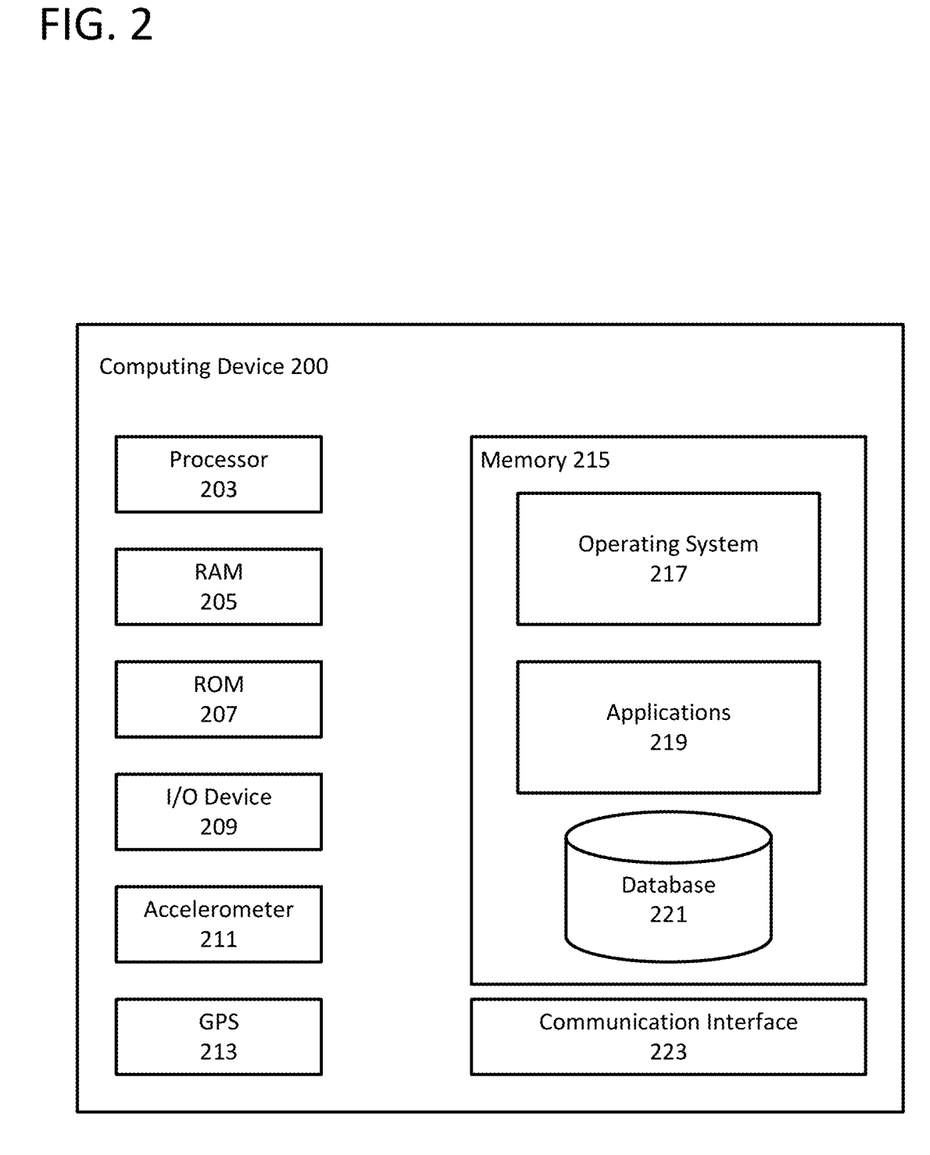
FIG. 2 shows an example computing device.

Any of the devices and systems described herein may be implemented, in whole or in part, using one or more computing devices described with respect to FIG. 2. Turning now to FIG. 2, a computing device 200 that may be used with one or more of the computational systems is described. The computing device 200 may comprise a processor 203 for controlling overall operation of the computing device 200 and its associated components, including RAM 205, ROM 207, input/output device 209, accelerometer 211, global-position system antenna 213, memory 215, and/or communication interface 223. A bus may interconnect processor(s) 203, RAM 205, ROM 207, memory 215, I/O device 209, accelerometer 211, global-position system receiver/antenna 213, memory 215, and/or communication interface 223. Computing device 200 may represent, be incorporated in, and/or comprise various devices such as a desktop computer, a computer server, a gateway, a mobile device, such as a laptop computer, a tablet computer, a smart phone, any other types of mobile computing devices, and the like, and/or any other type of data processing device.

Input/output (I/O) device 209 may comprise a microphone, keypad, touch screen, and/or stylus through which a user of the computing device 200 may provide input, and may also comprise one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may comprise volatile and nonvolatile, removable and non-removable media implemented in any method or technology for storage of information such as computer-readable instructions, data structures, program modules, or other data. Memory 215 may comprise one or more physical persistent memory devices and/or one or more non-persistent memory devices. Memory 215 may comprise random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first user.

Communication interface 223 may comprise one or more transceivers, digital signal processors, and/or additional circuitry and software, protocol stack, and/or network stack for communicating via any network, wired or wireless, using any protocol as described herein.

Processor 203 may comprise a single central processing unit (CPU), which may be a single-core or multi-core processor, or may comprise multiple CPUs. Processor(s) 203 and associated components may allow the computing device 200 to execute a series of computer-readable instructions (e.g., instructions stored in RAM 205, ROM 207, memory 215, and/or other memory of computing device 215, and/or in other memory) to perform some or all of the processes described herein. Although not shown in FIG. 2, various elements within memory 215 or other components in computing device 200, may comprise one or more caches, for example, CPU caches used by the processor 203, page caches used by the operating system 217, disk caches of a hard drive, and/or database caches used to cache content from database 221. A CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For example, in a multi-tiered application, a database cache on an application server may reduce data retrieval and data manipulation time by not needing to communicate over a network with a back-end database server. These types of caches and others may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the disclosure.

Figure 3:
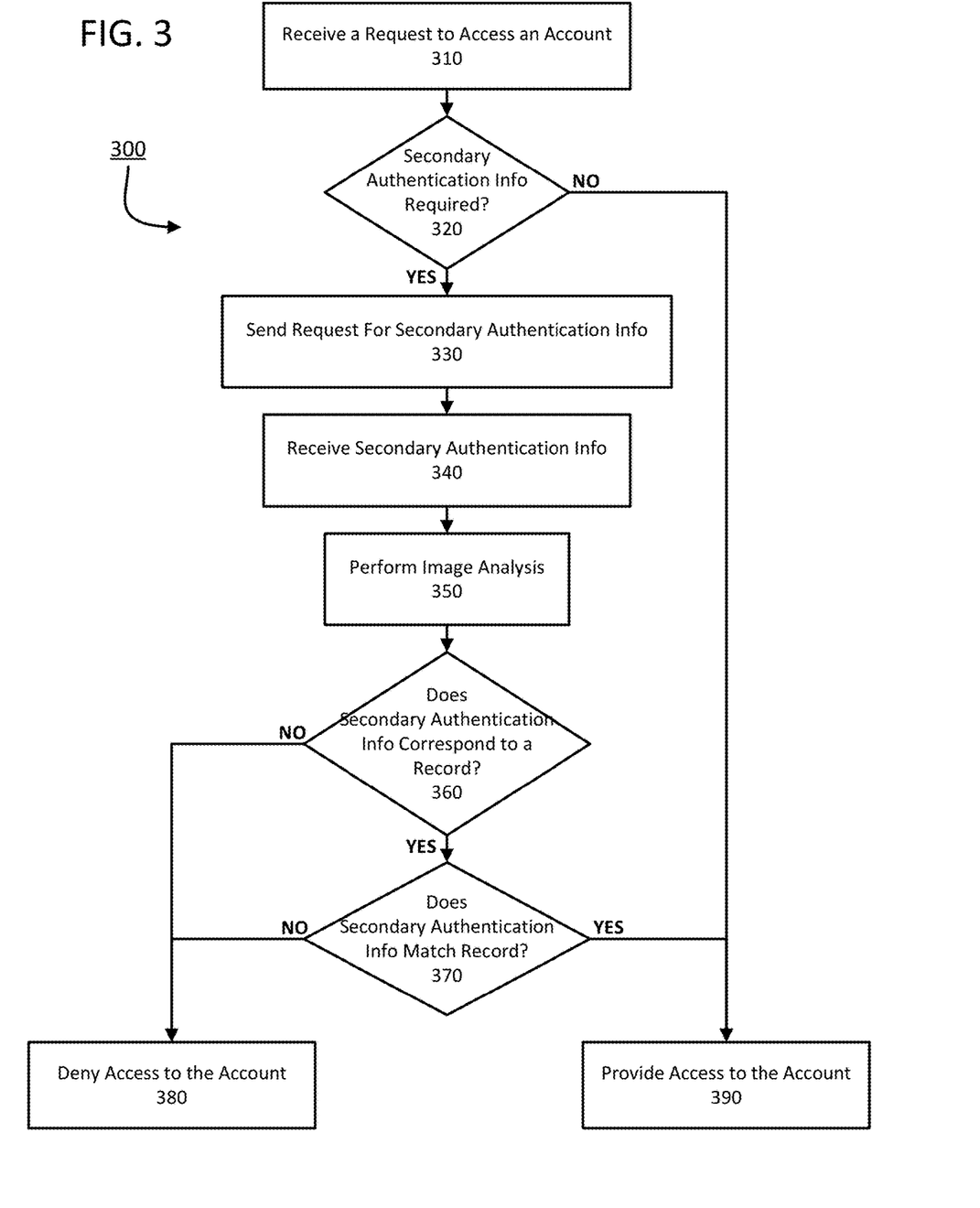
FIG. 3 shows an example of a process for performing multifactor authentication according to one or more aspects of the disclosure.

Financial institutions, such as banks, credit card issuers, brokerage houses, etc., may be privy to a user's transactional history. Financial institutions may leverage a user's transaction history as part of a multifactor authentication process. FIG. 3 shows a flow chart of a process for performing multifactor authentication according to one or more aspects of the disclosure. Some or all of the steps of process 300 may be performed using one or more computing devices as described herein, including, for example, first user device 110, second user device 120, server 130, or any combination thereof.

In step 310, a server (e.g., an application, such as banking application 132, executing on server 130) may receive a request to access an account. The request may be received from an application executing on a user device, such as a banking application or a web browser. In some examples, the request may be received from a user device. In this regard, the request may be made via a phone call with a customer service representative. The request to access the account may comprise authentication information, such as a username and password, a biometric identifier (e.g., a faceprint, a fingerprint, a voiceprint, an iris scan, etc.), an application identifier, a device identifier, a location of the user device (i.e., GPS, a network address (e.g., IP address), etc.), phone number, an HTTP cookie, etc.

In step 320, the server (e.g., an application, such as banking application 132, executing on server 130) may determine whether secondary authentication information should be submitted prior to accessing the account. The server may determine that secondary authentication information should be submitted, for example, if the server does not recognize one or more of: the application identifier, the device identifier, the location of the user device (i.e., GPS, a network address (e.g., IP address), etc.), phone number, an HTTP cookie, etc. Additionally or alternatively, the server may determine that secondary authentication information should be submitted, for example, if there were multiple failed password attempts, there was a request to reset a password associated with the account, the user was unable to correctly answer security questions, etc. Secondary authentication information may be submitted if the device identifier does not match one or more previously registered device identifiers. In further examples, the server may request secondary authentication information if user identification information does not match one or more previously registered pieces of user identification information or the user device is unable to provide one or more pieces of user identification information (e.g., mother's maiden name, social security number, date of birth, address, etc.). Based on the examples above, one or more of the data points discussed above (e.g., the application identifier, the device identifier, the location of the user device (i.e., GPS, a network address (e.g., IP address), etc.), phone number, the HTTP cookie, etc.) may be registered with the server in advance (e.g., during registration or from a previous login). If the server determines that secondary authentication information is not necessary, the server may provide the user device with access to the account in step 390.

If the server determines that secondary authentication information is necessary, the server (e.g., an application, such as banking application 132, executing on server 130) may send a request for the secondary authentication information to the user device at step 330. In some examples, the server may send one or more options for the secondary authentication information to the user device. The one or more options may comprise verification of a biometric identifier, a one-time password (e.g., one time-code), a proof of purchase, a unique identifier (e.g., transaction authorization code), etc. The server may receive a selection of the one or more options for the secondary authentication information from the user device.

In step 340, the server (e.g., an application, such as banking application 132, executing on server 130) may receive the secondary authentication information. In some examples, the secondary authentication information may be received with the selection of the one or more options for the secondary authentication information. As noted above, the secondary authentication information may comprise a biometric identifier, a one-time password (e.g., one time-code), a proof of purchase, etc. The proof of purchase may comprise an image of a receipt, the good, a UPC code, a SKU number, etc. The image may be captured by one or more image capture devices (e.g., camera) of the user device. The secondary authentication information may be received via a webpage, a text message from the user device, an application on the user device, an email associated with the user account, a web portal, an automated teller machine (ATM), etc.

In step 350, the server may analyze the received secondary authentication information. If the secondary authentication information comprises a biometric identifier or a one-time password (e.g., one time-code), the server may verify the biometric identifier and/or one-time password. If the secondary authentication information comprises a proof of purchase, the server may analyze the image to verify that the secondary authentication information is a proof of purchase. To verify that the secondary authentication information is a proof of purchase, the server may use machine learning to validate the proof of purchase. The machine learning model may be a neural network, such as a generative adversarial network (GAN) or a consistent adversarial network (CAN), such as a cyclic generative adversarial network (C-GAN), a deep convolutional GAN (DC-GAN), GAN interpolation (GAN-INT), GAN-CLS, a cyclic-CAN (e.g., C-CAN), or any equivalent thereof. The neural network may be trained using supervised learning, unsupervised learning, back propagation, transfer learning, stochastic gradient descent, learning rate decay, dropout, max pooling, batch normalization, long short-term memory, skip-gram, or any equivalent deep learning technique. The machine learning algorithm may be trained to recognize valid proof of purchases, such as receipts, a UPC code, a SKU number, etc. Additionally or alternatively, the machine learning algorithm may be trained to recognize one or more objects, products, goods, etc., which may be compared to an itemized list of products associated with one or more transaction records. If the proof of purchase is not deemed valid by the machine learning model, the server may deny the authentication attempt and process 300 may conclude. However, if the proof of purchase is valid, the server may proceed to analyze the image of the proof of purchase to identify the transaction information. In this regard, the server may analyze the image to identify, for example, transaction information. The analysis may comprise computer vision, object character recognition (OCR), text-based analysis, or an equivalent thereof. The transaction information may comprise at least one of: a logo of a merchant, a date of a transaction, a time of the transaction, a dollar amount of the transaction, an authorization code of the transaction, a plurality of digits of a transaction card used for the transaction, an item (e.g., good, produce, or service acquired during the transaction), or an equivalent thereof. In some examples, the transaction information may comprise an itemized list of items (e.g., goods, services, products, etc.) purchased during the transaction.

In step 360, the server may determine whether the transaction information corresponds to one or more records associated with the account. In this regard, the server may compare the transaction information to one or more transaction records associated with the user's account. In some examples, the server may determine that the transaction information corresponds to one or more records associated with the account based on the comparison. In some instances, the server may use fuzzy logic, or an equivalent partial matching algorithm, to determine whether the transaction information corresponds to one or more records. Computer vision, object character recognition (OCR), text-based analysis may identify portions of the information contained in the proof of purchase. Additionally or alternatively, computer vision and/or OCR may be used to identify a logo. The logo may be mapped to one or more merchant names, for example, stored in a local database. The one or more merchant names may be used to query the user's transactions to find a matching record. The server may also recognize a plurality letters of the merchant and/or an itemized good (e.g., product). In a further example, the server may recognize the day of the transaction, but not the month. In this regard, the server may determine that a first portion (e.g., the plurality of letters of the merchant and/or the item, the date of the transaction, etc.) of the transaction information matches a second portion of the one or more records associated with the account. When the server recognizes partial information from the proof of purchase, the server may determine that a plurality (e.g., 2 or more) of pieces of information from the proof of purchase may match the one or more records. For example, the server may determine that the partial merchant name and the amount of the transaction match one or more records. In another example, the server may determine that the partial item name (e.g., good, product, service, etc.) and date of the transaction match one or more records. Additionally or alternatively, the server may verify one or more portions of the proof of purchase for merchants the user may frequently visit. For instance, if the user makes repeated purchases from the same merchant, the server may verify a plurality of data points from a proof of purchase associated with the merchant before granting access to the account. As noted above, the server may determine whether an image comprises an object, good, product, etc. that the user may have recently purchased. In this regard, the server may determine whether the object, good, product, etc. correlates with one or more items associated with one or more transaction records. In this regard, some transaction records may comprise an itemized list. The server may determine whether an image of object, good, product, etc. correlates with one or more transaction records when verifying whether to grant access to the account. Additionally or alternatively, the UPC code and/or the SKU number may match one or more items associated with the one or more transaction records. If the transaction information does not match one or more records associated with the account, the server may deny access to the account in step 380.

However, when the transaction information matches one or more records associated with the account, the server may verify the secondary authentication information in step 370. Verifying the secondary authentication information may comprise determining that the date of the transaction and/or the time of the transaction is greater than a threshold. That is, the server may determine that the secondary authentication information is of a predetermined age. This may provide an additional layer of security by preventing a malicious user from gaining access to the account by making a purchase and using the proof of purchase to access the account. Additionally or alternatively, the server may determine that secondary authentication information is within a predetermined time frame. In further examples, the server may require that the secondary authentication information not be older than a second threshold. By imposing time restrictions on the secondary authentication information, the server may prevent a malicious actor from gaining unauthorized access by presenting a proof of purchase from a well-known and/or common merchant. If the secondary account information is unverified, the server may deny access to account in step 380. However, the server may provide access to the account in step 390 when the server verifies the secondary account information. In some instances, providing access to the account may comprise unlocking one or more account-related details, for example, for a customer-service representative to share during a phone call.

By having a user submit a proof of purchase associated with a transaction as part of a login process to access an account, the server may leverage secret transaction history to authenticate the user. As a result, the security of login attempts may be improved and the likelihood of an account takeover attempt being successful is reduced.

Figure 4A:
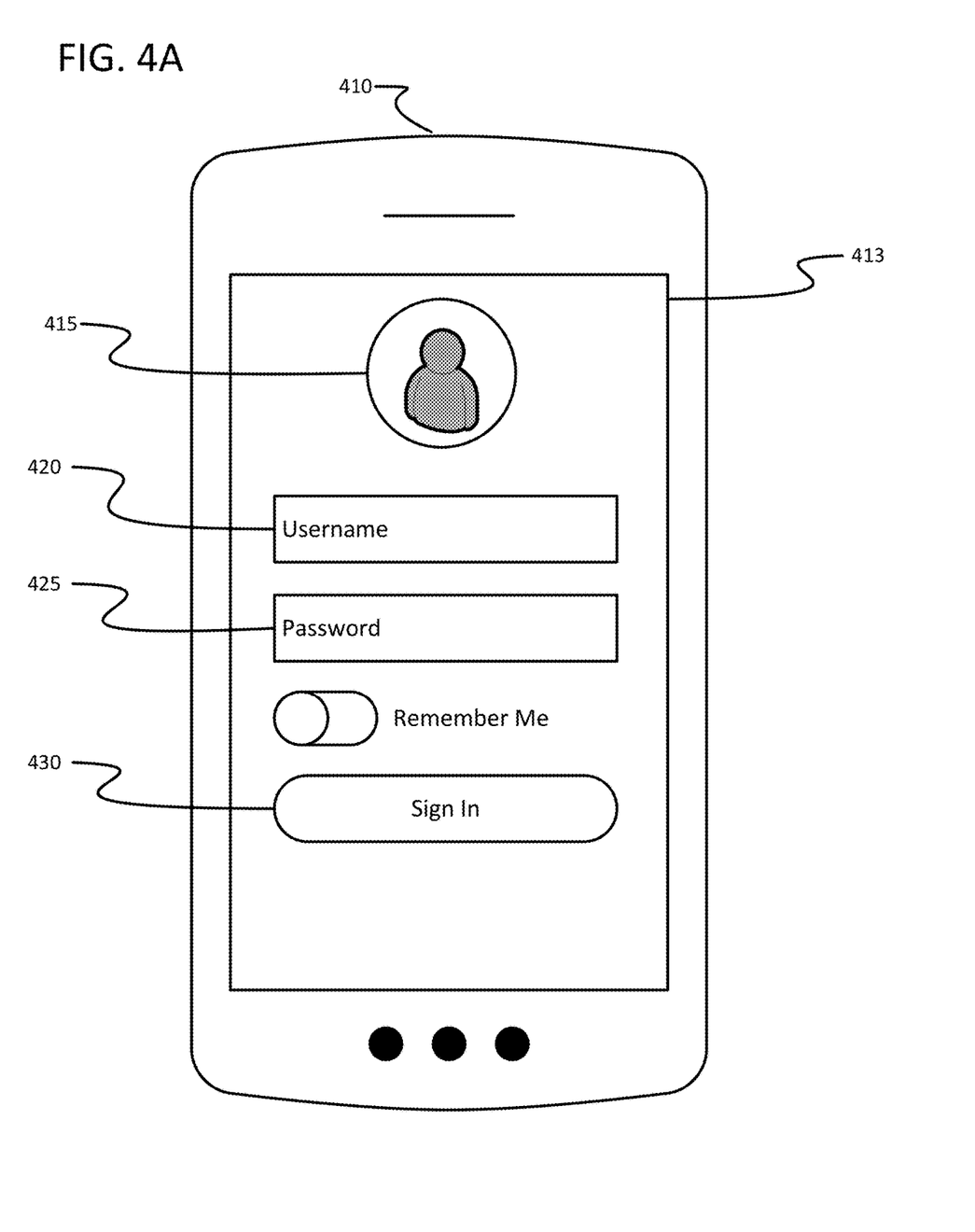
FIGS. 4A-4C show an example of the multifactor authentication being performed on a mobile device in accordance with one or more aspects of the disclosure.
Figure 4B:
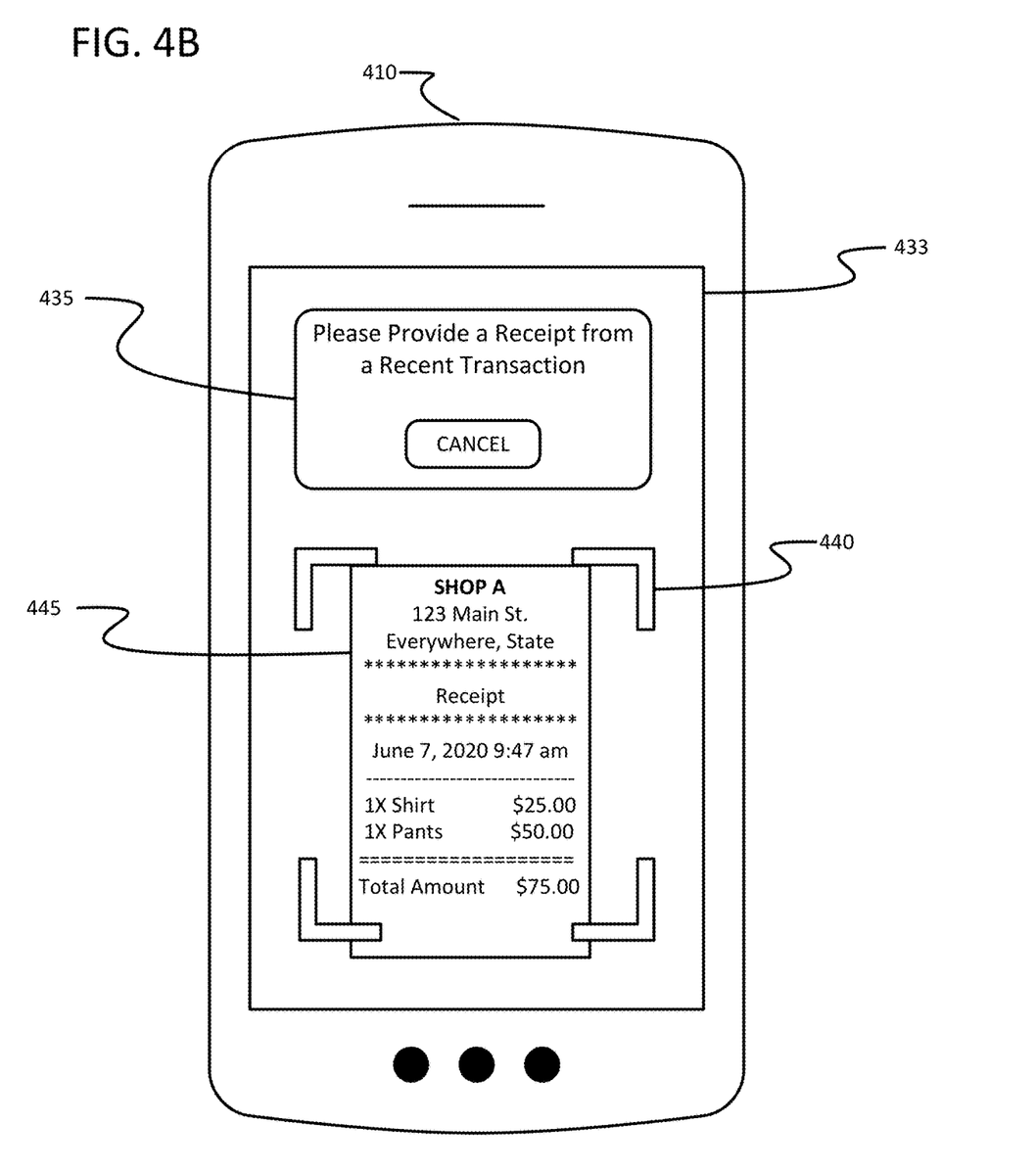
Figure 4C:
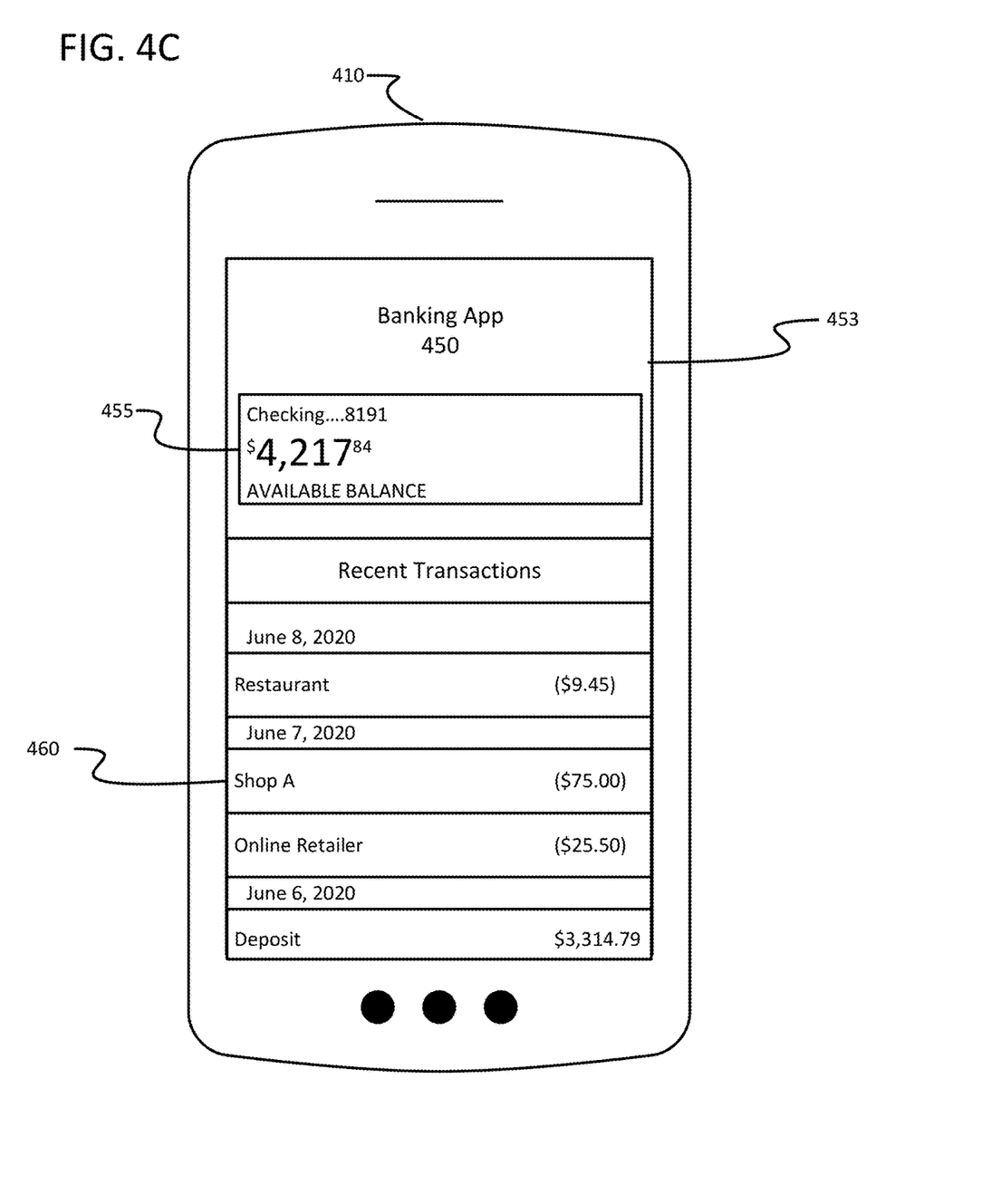

As discussed above, the multifactor authentication techniques described above may be performed when attempting to access an account through a mobile application ("app"). FIGS. 4A-4C show an example of the multifactor authentication being performed on a mobile device in accordance with one or more aspects of the disclosure.

FIG. 4A shows a mobile device 410. Mobile device 410 may be similar to first user device 110 and/or second user device 120 discussed above with respect to FIG. 1. Mobile device 410 may be executing an application, which may cause login screen 413 to be displayed on mobile device 410. Login screen 413 may comprise a user profile picture 415, a username field 420, a password field 425, and a sign-in button 430. The profile picture 415 may be set by the user. The user may choose a picture of himself/herself, an avatar, or any other suitable image for profile picture 415. In some instances, profile picture 415 may provide a first layer of security. In this regard, if profile picture 415 is not what the user expected, then the user may recognize that they are trying to login to a different account than their account. The username field 420 may allow the user to enter (e.g., type) their username for the application. Similarly, the password field 425 may allow the user to enter (e.g., type) their password for the application. Once the user enters their username and password, the user may click (e.g., select) sign-in button 430. In response to clicking sign-in button 430, the application may send (e.g., transmit) the username and password to a server for authentication purposes. In some examples, the application may also send additional information to the server, such as an application identifier, a device identifier, a phone number associated with mobile device 410, a location (i.e., GPS, a network address (e.g., IP address), etc.) of mobile device 410, an HTTP cookie, or any combination thereof. The server may verify one or more of the data points (e.g., username and password, the application identifier, the device identifier, the phone number associated with mobile device 410, the location (i.e., GPS, a network address (e.g., IP address), etc.) of mobile device 410, the HTTP cookie, etc.). When the data points are valid, the server may authenticate the user and grant access to the account. However, when the data points are invalid, the server may prompt the user for secondary authentication information.

FIG. 4B shows an example of an interface 433 for inputting secondary authentication information. Interface 433 may include prompt 435. Prompt 435 may provide an explanation that the user should provide a receipt from a receipt transaction as secondary authentication information. Interface 433 may also activate one or more image capture devices on mobile device 410. Accordingly, interface 433 may display focal crosshairs 440. The focal crosshairs 440 may be used to focus the one or more image capture devices on an object, such as receipt 445. Mobile device 410 may capture an image of receipt 445 and send (e.g., transmit) the image to the server for authentication. While an image capture device is shown in FIG. 4B, it will be appreciated that mobile device 410 may send (e.g., transmit) the proof of purchase via a text message, email, upload to a web portal, etc. As discussed above, the server may analyze the image, for example, using comprise computer vision, object character recognition (OCR), text-based analysis, or an equivalent thereof. The server may validate the proof of purchase and/or identify one or more of: a logo of a merchant, a date of a transaction, a time of the transaction, a dollar amount of the transaction, an authorization code of the transaction, or a plurality of digits of a transaction card used for the transaction, or an equivalent thereof. After identifying information associated with the image, the server may determine whether the date associated with the transaction is of a predetermined age (e.g., is not too recent). If the information is of the predetermined age, the server may determine whether the information corresponds to one or more records associated with the account. If the information does not correspond to one or more records, then the server may deny access to the account and the mobile device may return to the login screen 413 shown in FIG. 4A.

If the information does correspond to one or more records, mobile device 410 may display interface 453, as shown in FIG. 4C. In this regard, interface 453 may cause account information to be displayed on mobile device 410, via banking app 450. In this regard, display an account balance in account balance field 455. Additionally, a plurality of recent transactions may be displayed below the account balance field 455. In particular, the plurality of transactions may comprise record 460 that corresponds to the transaction associated with receipt 445. Based on record 460, the server may determine that the receipt 445 corresponds to and is in the possession of the accountholder. Accordingly, when the user provides receipt 445 as secondary authentication information, the server may verify the identity of the user and provide access to the account. As previously discussed, using receipt 445 as part of a multifactor authentication may improve the security of login attempts and reduce the likelihood of account takeover attempts being successful.

The multifactor authentication techniques may also be performed when signing-in via a web browser. FIGS. 5A-5D show an example of the multifactor authentication being performed via a web browser in accordance with one or more aspects of the disclosure.

Figure 5A:
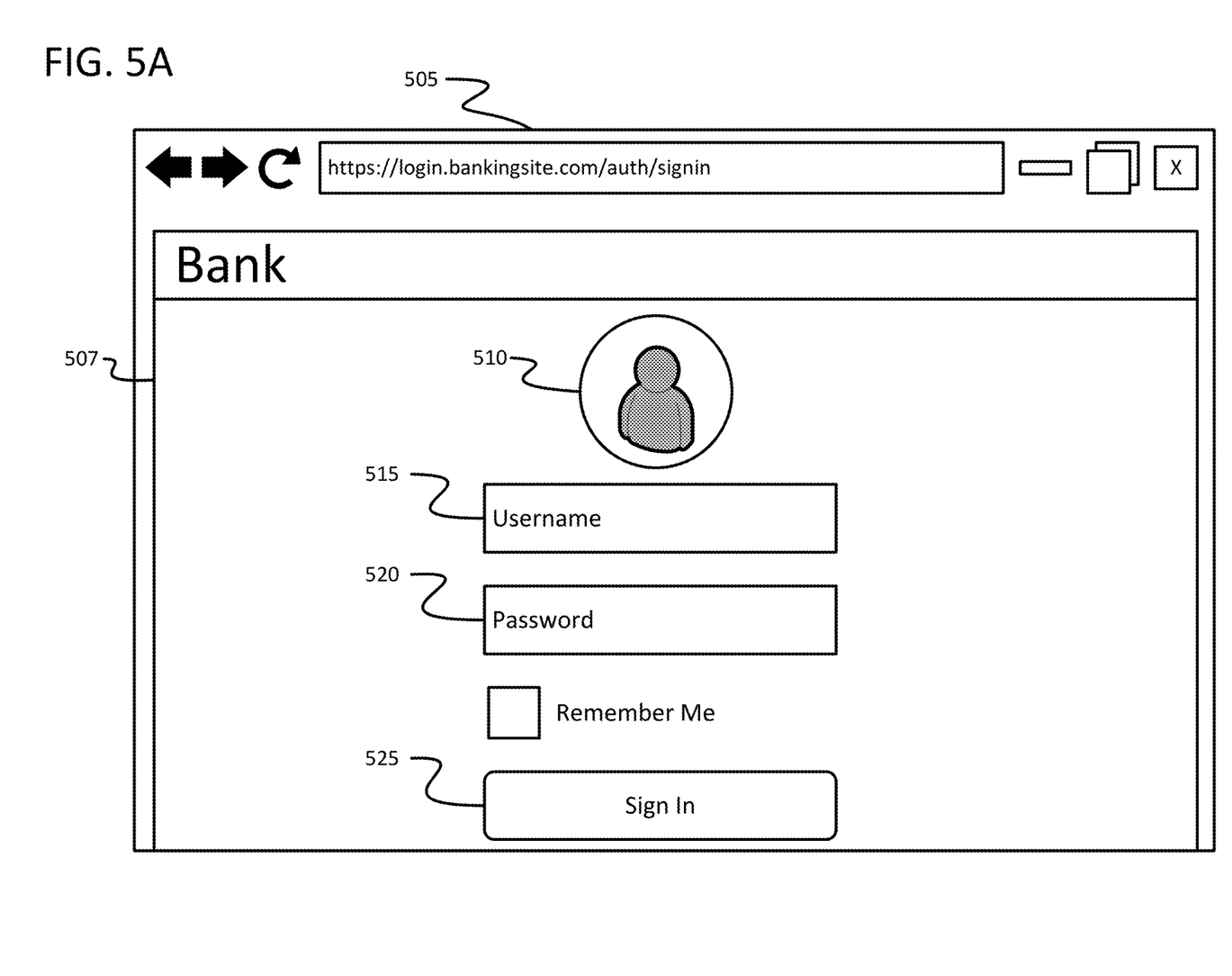
FIGS. 5A-5D show an example of the multifactor authentication being performed via a web browser in accordance with one or more aspects of the disclosure.

FIG. 5A shows an example of a web browser 505 displaying a login screen 507. Much like the login screen 413 discussed above with respect to FIG. 4A, login screen 507 may comprise a user profile picture 510, a username field 515, a password field 520, and a sign-in button 525. The username field 515 may allow the user to enter (e.g., type) their username, and the password field 520 may allow the user to enter (e.g., type) their password. The user may click (e.g., select) sign-in button 525 after entering their username and password. The browser 505 may send (e.g., transmit) the username and password to a server, via an encrypted communication channel (e.g., SSL, TLS), for authentication purposes. The browser may also send (e.g., transmit) additional information to the server, such as a device identifier, a location (i.e., GPS, a network address (e.g., IP address), etc.), an HTTP cookie, or any combination thereof. The server may verify one or more of the data points (e.g., username and password, the device identifier, the location (i.e., GPS, a network address (e.g., IP address), etc.), the HTTP cookie, etc.). When the data points are valid, the server may authenticate the user and grant access to the account. However, when the data points are invalid, the server may prompt the user for secondary authentication information.

Figure 5B:
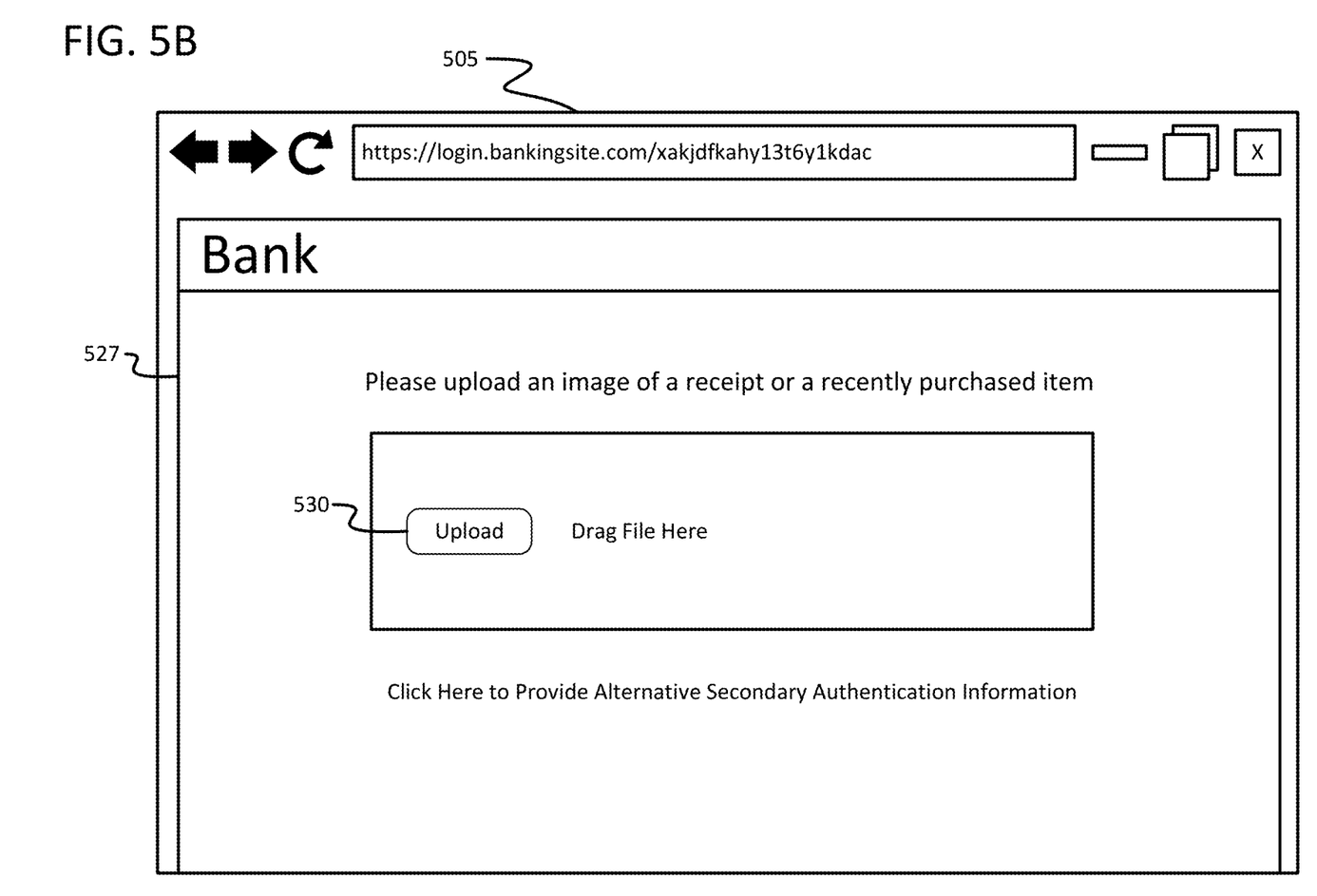

FIG. 5B shows an example of webpage 527 that prompts the user for secondary authentication information. In this regard, webpage 527 may comprise an upload button 530 to upload the proof of purchase. Additionally or alternatively, webpage 527 may comprise a field where the user can drag and drop the proof of purchase. While FIG. 5B illustrates uploading the proof of purchase, it will be appreciated that the proof of purchase may be sent (e.g., transmitted) via a text message, email, etc. The proof of purchase may comprise an image of a receipt, a UPC code, a SKU number, a photo of the good (e.g., product), etc. In some examples, the proof of purchase may comprise an email receipt. Browser 505 may send (e.g., transmit) the proof of purchase to the server for authentication. As discussed above, the server may validate the image and/or analyze the image, for example, using comprise computer vision, object character recognition (OCR), text-based analysis, or an equivalent thereof to identify, for example, one or more of: a logo of a merchant, a date of a transaction, a time of the transaction, a dollar amount of the transaction, an authorization code of the transaction, or a plurality of digits of a transaction card used for the transaction, or an equivalent thereof. After identifying information associated with the image, the server may determine whether the date associated with the transaction is of a predetermined age (e.g., is not too recent). If the information is not of the predetermined age, the server may determine reject the proof of purchase. Additionally or alternatively, the server may deny the email receipt and request a different proof of purchase, for example, if there are concerns that the user's email account may be compromised.

Figure 5C:
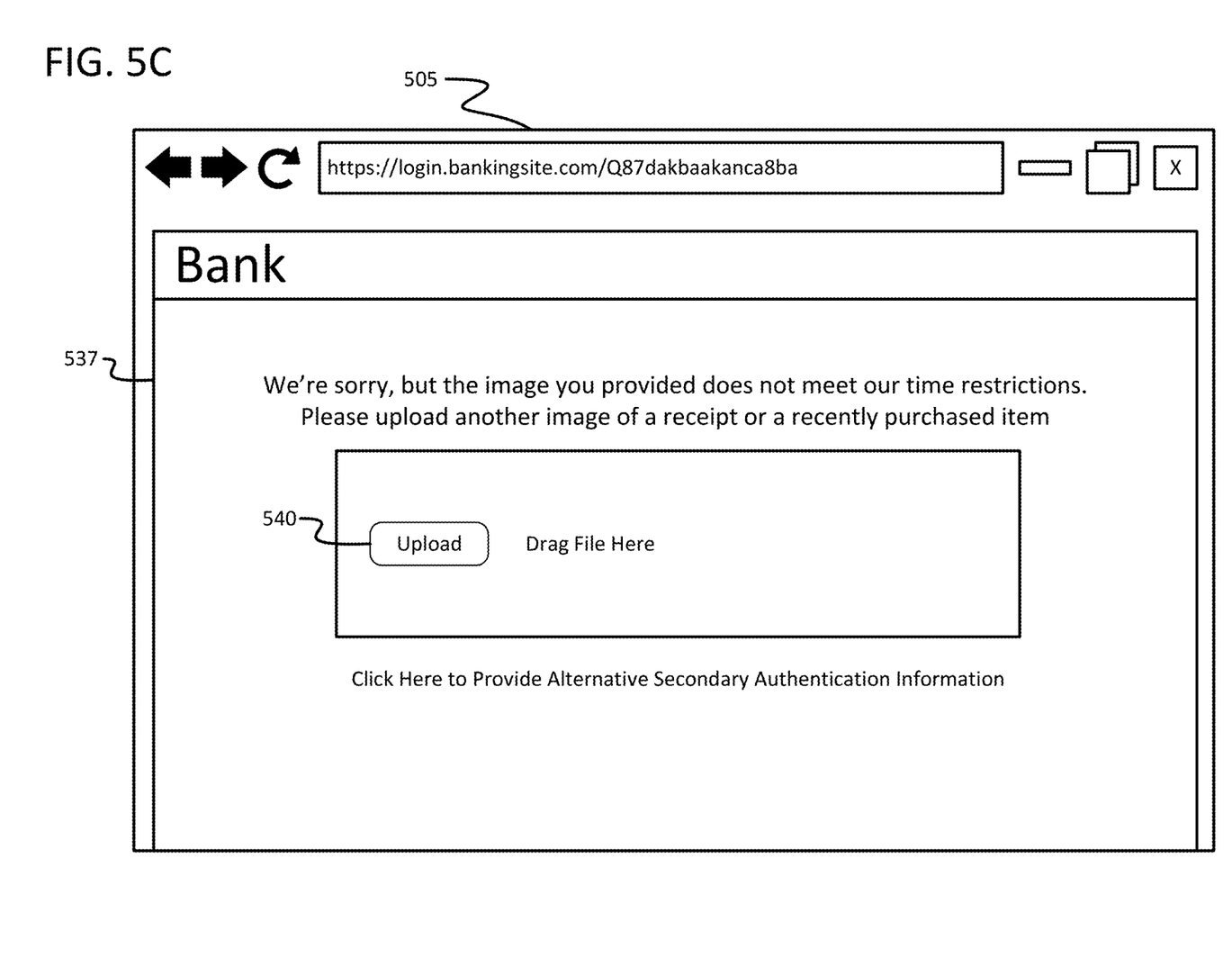
Figure 5D:
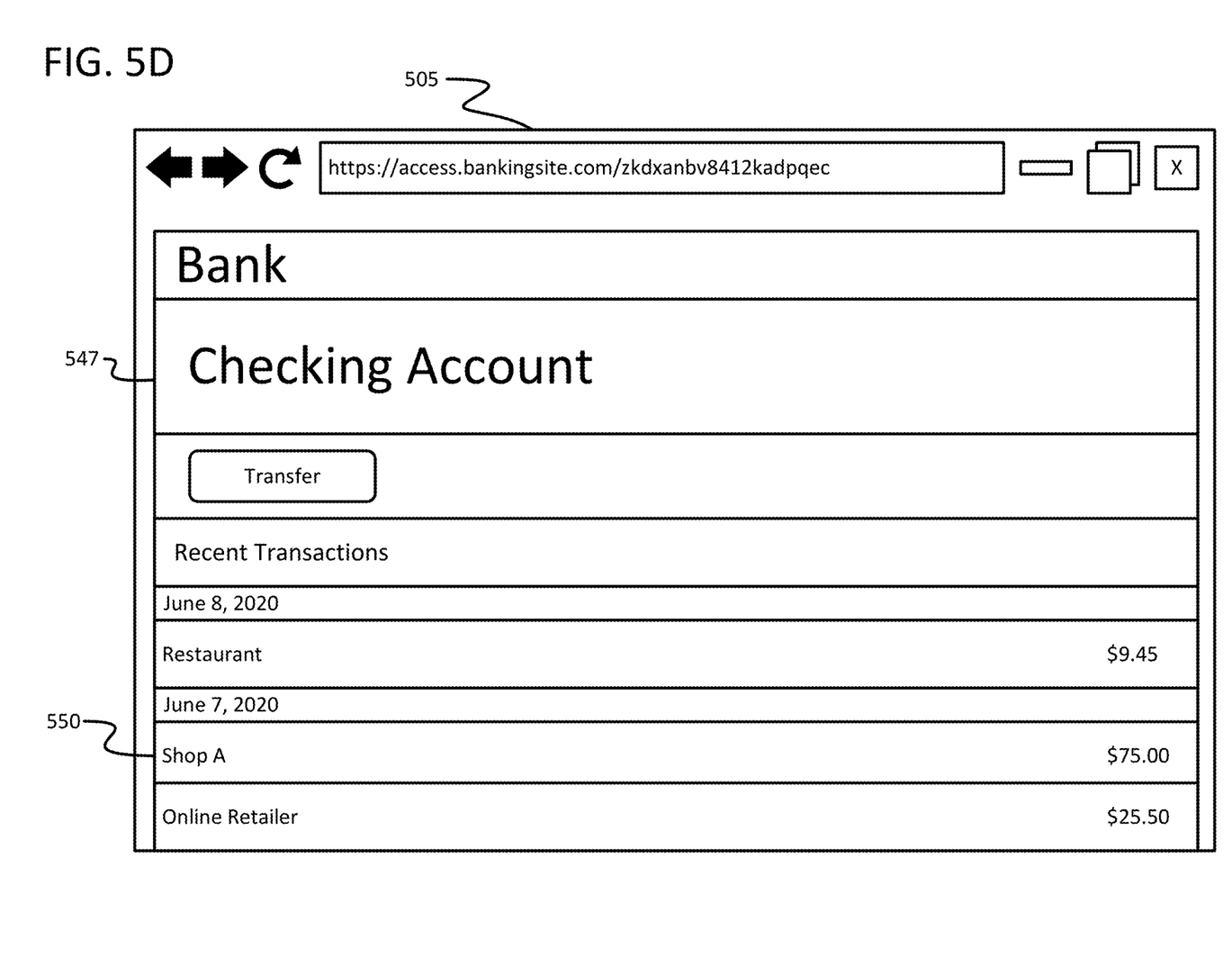

When the server rejects the proof of purchase, the server may cause webpage 537 to be displayed on browser 505, as shown in FIG. 5C. In this regard, webpage 537 may prompt the user for different secondary authentication information. Like FIG. 5B, webpage 537 may comprise an upload button 540 to upload the proof of purchase and/or a field where the user can drag and drop the proof of purchase. Again, browser 505 may send (e.g., transmit) the proof of purchase to the server for authentication. If the information is of the predetermined age and/or there are no concerns that the user's email may be compromised, the server may determine validate the proof of purchase by comparing the proof of purchase to one or more records of the user's account's transaction history. If the information does correspond to one or more records, the server may cause webpage 547 to be displayed on web browser 505, as shown in FIG. 5D. Webpage 547 may cause account information to be displayed on browser 505. For example, browser 505 may display a plurality of recent transactions. In particular, the plurality of transactions may comprise record 550, which corresponds to the transaction associated with the proof of purchase provided by the accountholder. Based on record 550, the server may determine that the user requesting access to the account is valid. As noted throughout, using a proof of purchase as part of a multifactor authentication may improve the security of login attempts and reduce the likelihood of account takeover attempts being successful.

The above-described systems, devices, and methods may improve the security of login attempts and reduce the likelihood of account takeover attempts being successful by using a proof of purchase as part of a multifactor authentication process. As described above, a user may submit a proof of purchase associated with a transaction as part of a login process to access an account. A server may determine information associated with the transaction from the proof of purchase, and then determine whether the information matches one or more records associated with the user's account. When the information matches one or more records, the server may authenticate the user and provide access to the account. In this way, the server may leverage secret transaction history known to the server and the user to authenticate the user. As a further precautionary measure, the server may deny recent proofs of purchase to prevent the malicious user from making a purchase and using the proof of purchase to access the account.

One or more features discussed herein may be embodied in computer-usable or readable data and/or computer-executable instructions, such as in one or more program modules, executed by one or more computers or other devices as described herein. Program modules may comprise routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features discussed herein, and such data structures are contemplated within the scope of computer executable instructions and computer-usable data described herein. Various features described herein may be embodied as a method, a computing device, a system, and/or a computer program product.

Although the present disclosure has been described in terms of various examples, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner Thus, the present disclosure should be considered in all respects as illustrative and not restrictive. Accordingly, the scope of the disclosure should be determined not by the examples, but by the appended claims and their equivalents.

What is claimed is:

1. A method comprising:
    sending, by a user device to a server, a request to access an account, wherein the request to access the account comprises authentication information;
    receiving, by the user device, a request for secondary authentication information, wherein the request for secondary authentication information comprises one or more authentication options for a user associated with the user device to select as part of a multifactor authentication process;
    sending, based on receiving a selection of a proof of purchase from the one or more authentication options, the secondary authentication information comprising an image of a receipt; and
    accessing, based on an amount of the receipt matching transaction information associated with the account, the account.

2. The method of claim 1, further comprising:
    capturing, using an image capture device, the image of the receipt.

3. The method of claim 2, wherein the image capture device comprises one or more cameras on the user device.

4. The method of claim 1, wherein the sending the secondary authentication information comprises uploading the image of the receipt via a web browser.

5. The method of claim 1, wherein the sending the secondary authentication information comprises sending the image of the receipt via an electronic communication.

6. The method of claim 5, wherein the electronic communication comprises at least one of a text message or an e-mail.

7. The method of claim 1, wherein the sending the secondary authentication information comprises uploading the image of the receipt via an automated teller machine (ATM).

8. The method of claim 1, wherein the authentication information comprises at least one of:
    a username and password,
    a biometric identifier,
    an application identifier,
    a device identifier,
    a phone number,
    a location of the user device, or
    an HTTP cookie.

9. The method of claim 1, wherein the request for the secondary authentication information is received after a predetermined number of failed login attempts.

10. The method of claim 1, wherein the user device comprises a mobile device.

11. A computing device comprising:
    one or more processors; and
    memory storing instructions that, when executed by the one or more processors, cause the computing device to:
        send, to a server, a request to access an account, wherein the request to access the account comprises authentication information;
        receive a request for secondary authentication information, wherein the request for secondary authentication information comprises one or more authentication options for a user associated with the computing device to select as part of a multifactor authentication process;
        send, based on receiving a selection of a proof of purchase from the one or more authentication options, the secondary authentication information comprising an image of a receipt; and
        access, based on an amount of the receipt matching transaction information associated with the account, the account.

12. The computing device of claim 11, further comprising:
    an image capture device configured to capture the image of the receipt.

13. The computing device of claim 11, further comprising:
    an antenna configured to receive one or more signals used to determine a location of the computing device, wherein the authentication information comprises the location of the computing device.

14. A system comprising:
a server; and
a user device,
wherein the user device is configured to:
- send, to the server, a request to access an account, wherein the request to access the account comprises authentication information;
- receive a request for secondary authentication information, wherein the request for secondary authentication information comprises one or more authentication options for a user associated with the user device to select as part of a multifactor authentication process;
- send, based on receiving a selection of a proof of purchase from the one or more authentication options, the secondary authentication information comprising an image of a receipt; and
- access, based on an amount of the receipt matching transactional information associated with the account, the account;

wherein the server is configured to:
- receive the secondary authentication information;
- perform an image analysis of the image of the receipt to identify transaction information;
- verify, based on a determination that the transaction information corresponds to one or more records associated with the account, the secondary authentication information; and
- provide, based on verification of the secondary authentication information, access to the account.

15. The system of claim 14, wherein sending the secondary authentication information comprises at least one of:
- uploading the image of the receipt via a web browser;
- sending the image of the receipt via an electronic communication; or
- uploading the image of the receipt via an automated teller machine (ATM).

16. The system of claim 14, wherein the request for the secondary authentication information is received after a predetermined number of failed login attempts.

17. The system of claim 14, wherein the user device comprises a mobile device.

18. One or more non-transitory media storing instructions that, when executed, cause a computing device to:
- send, to a server, a request to access an account, wherein the request to access the account comprises authentication information;
- receive a request for secondary authentication information, wherein the request for secondary authentication information comprises one or more authentication options for a user associated with the computing device to select as part of a multifactor authentication process;
- send, based on receiving a selection of a proof of purchase from the one or more authentication options, the secondary authentication information comprising an image of a receipt; and
- access, based on an amount of the receipt matching transactional information associated with the account, the account.

19. The one or more non-transitory media of claim 18, wherein the instructions, when executed, cause the computing device to send the secondary authentication information by performing at least one of:
- uploading the image of the receipt via a web browser;
- sending the image of the receipt via an electronic communication; or
- uploading the image of the receipt via an automated teller machine (ATM).

20. The one or more non-transitory media of claim 18, wherein the request for the secondary authentication information is received after a predetermined number of failed login attempts.

* * * * *